(12) United States Patent
Krauss et al.

(10) Patent No.: US 6,499,459 B1
(45) Date of Patent: Dec. 31, 2002

(54) METHOD AND APPARATUS FOR CREATING HOMOGENEOUS CHARGE COMPRESSION IGNITION

(75) Inventors: Gordon Gustav Krauss, Ann Arbor, MI (US); Jialin Yang, Canton, MI (US); Larry Van Reatherford, Clarkston, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/658,535

(22) Filed: Sep. 9, 2000

(51) Int. Cl.[7] .................................................. F02B 5/00
(52) U.S. Cl. ...................................................... 123/305
(58) Field of Search ............................ 123/25 R, 25 C, 123/275, 276, 279, 525, 305, 568.12

(56) References Cited

U.S. PATENT DOCUMENTS

| | | | |
|---|---|---|---|
| 3,738,332 A | * 6/1973 | Eyzat et al. | ................ 123/275 |
| 4,240,381 A | 12/1980 | Lowther | |
| 4,499,885 A | * 2/1985 | Weissenbach et al. | ...... 123/525 |
| 4,613,341 A | 9/1986 | Zaweski et al. | |
| 4,838,213 A | 6/1989 | Gerace | |
| 4,846,114 A | 7/1989 | List | |
| 5,035,206 A | * 7/1991 | Welch et al. | ........... 123/27 GE |
| 5,381,760 A | 1/1995 | Simons | |
| 5,535,716 A | * 7/1996 | Sato et al. | .................... 123/279 |
| 5,570,667 A | 11/1996 | Gray et al. | |
| 5,771,857 A | * 6/1998 | Willi | ........................... 123/305 |
| 5,832,880 A | * 11/1998 | Dickey | ...................... 123/25 C |
| 5,852,999 A | * 12/1998 | Chan | .......................... 123/628 |
| 5,875,743 A | * 3/1999 | Dickey | ...................... 123/25 C |
| 5,979,398 A | * 11/1999 | Yanagihara | .................. 123/299 |
| 5,996,558 A | * 12/1999 | Ouellette et al. | ........... 123/506 |
| 6,173,691 B1 | * 1/2001 | Yanagihara | ................. 123/299 |
| 6,192,632 B1 | * 2/2001 | Yanagihara | ................. 123/299 |
| 6,213,086 B1 | * 4/2001 | Chmela et al. | ............. 123/276 |
| 6,220,233 B1 | * 4/2001 | Pierpont | ................ 123/568.12 |
| 6,318,329 B1 | * 11/2001 | Sato | ......................... 123/192.1 |

* cited by examiner

Primary Examiner—Marguerite McMahon
(74) Attorney, Agent, or Firm—Chupa & Alberti PC

(57) ABSTRACT

An apparatus 10 and a method for producing homogeneous charge compression ignition within a cylinder 14 by the controlled introduction of material into the cylinder 14 when the piston 16 reaches a top dead center position. The material may have a relatively high temperature and pressure and may comprise superheated water.

10 Claims, 1 Drawing Sheet

METHOD AND APPARATUS FOR CREATING HOMOGENEOUS CHARGE COMPRESSION IGNITION

FIELD OF THE INVENTION

The present invention generally relates to a method and an apparatus for creating homogeneous charge compression ignition and more particularly, to a method and an apparatus for creating such homogenous charge compression ignition within a cylinder of an engine.

BACKGROUND OF THE INVENTION

Homogeneous charge compression ignition typically requires the combustion of a mixture of fuel and air within an engine cylinder by an increase of pressure within the cylinder, thereby obviating the need for a spark plug or similar type of device or assembly. While this approach does allow for a more efficient operation of the engine and a concomitant reduction in undesirable emissions, current implementations have several undesirable drawbacks.

For example, some of these current implementations cause severe knock and engine component damage due to their inability to cause the ignition to occur at a predetermined or controlled time, thereby causing the ignition to occur, by way of example and without limitation, as the piston is beginning to and/or continuing to upwardly move in the cylinder, thereby causing an "early ignition" (e.g., an ignition occurring far in advance of the piston occupying a "top dead center" position) and thereby causing the previously delineated knock and component damage. Other of these current implementations require a heating of air which is initially communicated into the cylinder and/or the addition of relatively large amounts of combustion or ignition produced by-products or "EGR" to the fuel which is also initially communicated to the cylinder. These approaches reduce power by decreasing or displacing oxygen, do not reliably provide such desired ignition when relatively high engine power is required, and may also provide ignition far in advance of the piston occupying the top dead center position. To overcome these previously delineated drawbacks, other implementations utilize a relatively costly and complicated "boost piston" arrangement.

There is therefore a need for a method and an apparatus for providing such desired ignition and which overcomes at least some of the previously delineated drawbacks of prior methods and apparatuses.

SUMMARY OF THE INVENTION

It is a first object of the present invention to provide a method and an apparatus for providing and/or creating homogeneous charge compression ignition in a manner which overcomes some or all of the previously delineated drawbacks of prior methods, apparatuses, and implementations.

It is a second object of the present invention to provide a method and an apparatus for providing homogeneous charge compression ignition in a cost-effective manner and without increasing the likelihood of undesirable knock and/or damage to the engine.

It is a third object of the present invention to provide a method and an apparatus for providing homogeneous charge compression ignition by the selective introduction of relatively high pressure and high temperature material as a piston reaches a top dead center position.

According to a first aspect of the present invention, an assembly is provided for use with a cylinder containing a piston which is movable from a first position to a top dead center position. The assembly includes a valve assembly which is coupled to material and which injects the material into the cylinder as the piston is moved to the top dead center position.

According to a second aspect of the present invention, a method is provided. The method is effective to selectively ignite a mixture of fuel and air within a cylinder which movably contains a piston. The method includes the steps of injecting material into the cylinder as the piston moves to a top dead center position, thereby igniting the mixture.

These and other features, aspects, and advantages of the present invention will become apparent from a reading of the following detailed description of the preferred embodiment of the invention and by reference to the following drawings.

DETAILED DESCRIPTION OF THE PREFERRED EMBEDMENT OF THE INVENTION

Figure 1:
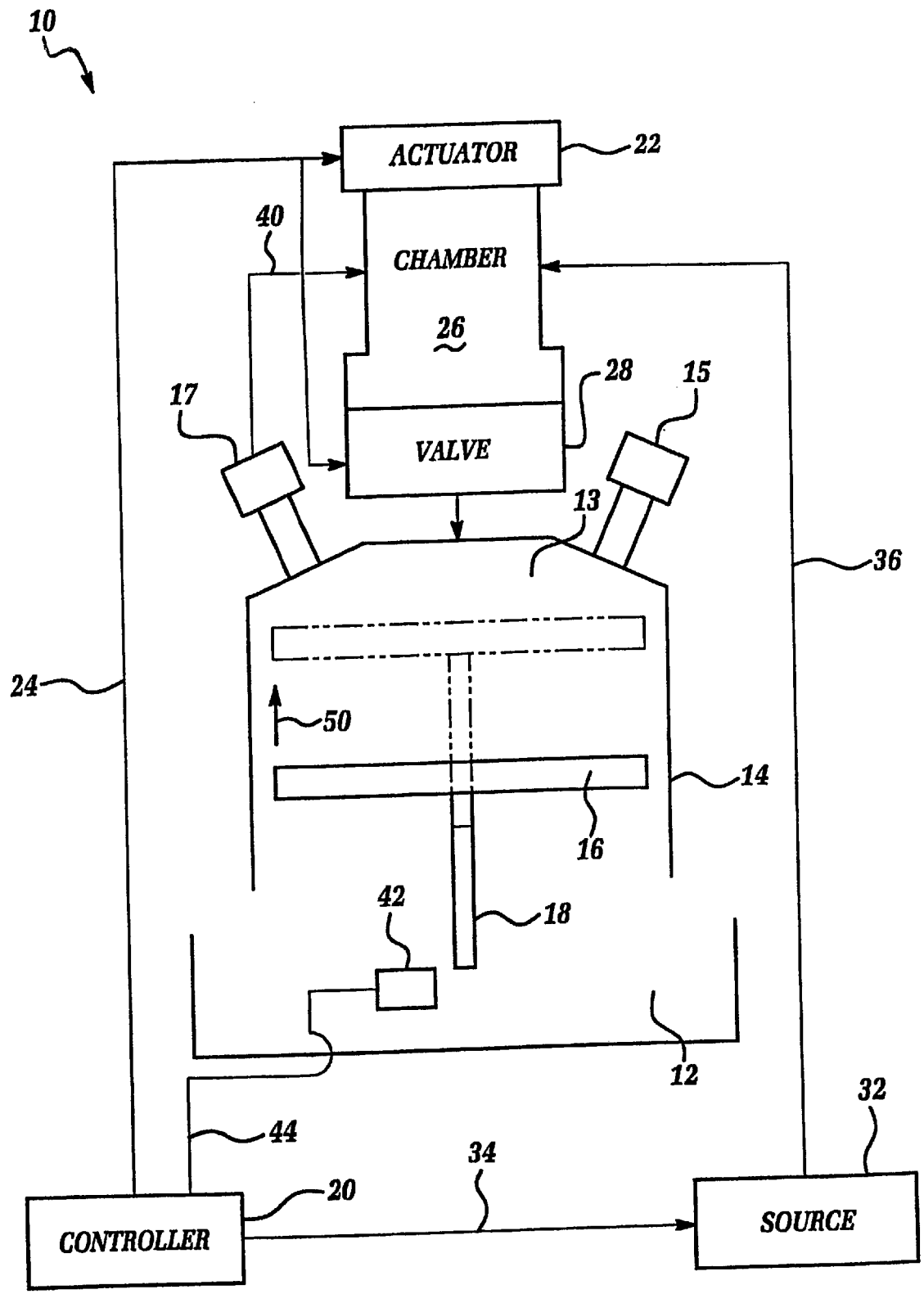
FIG. 1 is a block diagram of a homogeneous charge compression ignition assembly which is made in accordance with the teachings of the preferred embodiment of the invention.

Referring now to FIG. 1, there is shown a homogeneous charge compression ignition assembly 10 which is made in accordance with the teachings of the preferred embodiment of the invention. As shown, assembly 10 is used in combination with an internal combustion engine 12 having a number of cylinders, such as cylinder 14. It should be appreciated that while only one cylinder 14 is shown and described, the assembly 10 may be used in combination with all of the cylinders of the engine 12 in a substantially identical manner as is discussed below with respect to the cylinder 14.

It should further be appreciated that cylinder 14 includes a movable piston 16 which is attached to a connecting rod 18 and the connecting rod 18 is attached to a crankshaft (not shown), thereby allowing the combustion, occurring within the cylinder 14, to produce torque. That is, piston 16 is movable from the bottom of the cylinder 14 to a top dead center position, near the top 13 of the cylinder 14. Combustion, within the cylinder 14, causes the piston 16 to be forcibly moved to the bottom of the cylinder 14, thereby imparting force on the connecting rod 18 and rotating or imparting torque to the crankshaft (not shown). Cylinder 14 further includes an inlet port 15 which selectively allows air to be communicated into the cylinder 14 and an outlet port 17 which allows by-products of the combustion to exit the cylinder 14.

Assembly 10 includes a controller 20 which operates under stored program control and actuator 22, such as a solenoid, which is physically, communicatively, and controllably coupled to the controller 20 by use of bus 24. Assembly 10 further includes a chamber 26 which is physically coupled to the actuator 22, and a valve 28 which is similarly and communicatively coupled to the chamber 26 and to the cylinder 14. Controller 20 is physically and controllably coupled to the valve 28 by bus 24. In one non-limiting embodiment, assembly 10 further includes a source of material 32 which is physically and communicatively coupled to the controller 20, by use of bus 34. The source 32 is further physically and communicatively coupled to the chamber 26 by conduit 36. The outlet port 17, in yet another non-limiting embodiment of the invention, is communicatively coupled to the chamber 26 by conduit 40. Assembly 10 further includes a position sensor 42 which is physically and communicatively coupled to the controller 20 by use of bus 44.

In operation, air and fuel are initially communicated into the cylinder 14 by use of the port 15. The piston 16 begins to upwardly move within cylinder 14 (in the general direction of arrow 50) and the position of the piston 16, within the cylinder 14, is sensed by sensor 42 and communicated to the controller 20 by use of bus 44. When the piston 16 reaches a top dead center position or relatively close to a top dead center position, the controller 20, in one non-limiting embodiment, causes material to be communicated from the source 32 to the chamber 26, causes the valve 28 to move from a closed to an open position and further causes the actuator 22 to force the communicated material through the opened valve 28 and into the cylinder 14, thereby causing the material to have a relatively high pressure, effective to cause substantially automatic or "auto" ignition within the cylinder 14. The source material may be "pre-heated" by the engine 12 or by another heat source in combination with a heat exchanger. The material may also comprise superheated water or water vapor. In a non-limiting embodiment, combustion by products, exiting the port 17, may be communicated to the chamber 26, by conduit 40, and temporarily stored within the chamber 26. The temporarily stored by-products may then be later forcibly caused to enter the cylinder 14 in the manner which has been previously delineated above. The valve 28 is closed after the material forcibly enters the cylinder 14.

In this manner, the material is selectively and controllably injected only when the piston substantially reaches a top dead center position and the ignition occurs only when the piston 16 reaches or substantially reaches a top dead center position, thereby substantially preventing undesired knock and engine damage without the use of a relatively costly and complex booster piston. Assembly 10 may be used in the remaining cylinders (not shown) of engine 12 in a substantially identical manner. In another non-limiting embodiment, the pressure of the injected material may vary according to the type of utilized fuel (e.g., the amount of octane or cetane occurring within the fuel), according to ambient temperature, and/or according to an amount of power required by the engine.

It is to be understood that the invention is not limited to the exact construction or method which has been delineated above, but that various changes and modifications may be made without departing from the spirit and the scope of the inventions as are more fully set forth in the following claims.

What is claimed is:

1. An assembly comprising:
   a cylinder having a first intake valve, a second exhaust valve, and a third valve, said cylinder selectively receives a mixture of air and fuel from said first intake valve and which selectively emits exhaust gases through said second exhaust valve;
   a piston which is movably disposed within said cylinder and which is selectively movable to a top dead center position within said cylinder; and
   an assembly including a material containment chamber having an amount of material contained therein, a movable actuator, wherein said chamber is communicatively coupled to said cylinder through said third valve and wherein said actuator is coupled to said material containment chamber effective to cause auto ignition of said mixture to occur by forcing said material into said cylinder, thereby increasing the pressure within said cylinder only when said piston is substantially at said top dead center position.

2. The assembly of claim 1 wherein said assembly further comprises a source of said material which is coupled to said third valve; and a controller which is coupled to said third valve.

3. The assembly of claim 2 wherein said material comprises gas which has a relatively high temperature.

4. The assembly of claim 3 wherein said assembly further comprises a heat exchanger which delivers heat to said gas.

5. The assembly of claim 2 further comprising a position sensor which is coupled to said controller.

6. A method for igniting a mixture of fuel and air within a cylinder having a first intake valve and a second exhaust valve and which movably contains a piston, said method comprising the steps of:
   providing a material containment chamber having an amount of material contained therein;
   providing a third injection valve;
   coupling said third injection valve to said cylinder;
   communicatively coupling said chamber to said cylinder through a third injection valve;
   providing a movable actuator assembly and coupling said movable actuator to said material containment chamber; and
   injecting said material into said cylinder through said third injection valve by said movement of said actuator only when said piston substantially moves to a top dead center position within said cylinder, thereby increasing the pressure within said cylinder and igniting said mixture.

7. The method of claim 6 wherein said material comprises gas.

8. The method of claim 7 wherein said gas is formed by the selective combustion of said mixture of air and fuel within said cylinder.

9. The method of claim 8 wherein said gas has a relatively high temperature and a relatively high pressure.

10. The method of claim 9 wherein said material is injected only when said piston substantially moves to a top dead center position.

* * * * *